(12) United States Patent
Rong et al.

(10) Patent No.: US 10,266,345 B2
(45) Date of Patent: Apr. 23, 2019

(54) HEAT, FLEX FATIGUE AND OZONE RESISTANT CONVEYOR BELT COVER

(71) Applicant: ContiTech Transportbandsysteme GmbH, Hannover (DE)

(72) Inventors: Guangzhuo Rong, Hudson, OH (US); Thomas George Burrowes, North Canton, OH (US)

(73) Assignee: ContiTech Transportbandsysteme GmbH, Hannover (DE)

( * ) Notice: Subject to any disclaimer, the term of this patent is extended or adjusted under 35 U.S.C. 154(b) by 0 days.

(21) Appl. No.: 15/746,000

(22) PCT Filed: Jun. 29, 2016

(86) PCT No.: PCT/US2016/039987
§ 371 (c)(1),
(2) Date: Jan. 19, 2018

(87) PCT Pub. No.: WO2017/019235
PCT Pub. Date: Feb. 2, 2017

(65) Prior Publication Data
US 2018/0222678 A1 Aug. 9, 2018

Related U.S. Application Data

(60) Provisional application No. 62/198,759, filed on Jul. 30, 2015.

(51) Int. Cl.
*C08L 9/00* (2006.01)
*B65G 15/34* (2006.01)
*B65G 15/38* (2006.01)

(52) U.S. Cl.
CPC .............. *B65G 15/34* (2013.01); *B65G 15/38* (2013.01); *C08L 9/00* (2013.01)

(58) Field of Classification Search
None
See application file for complete search history.

(56) References Cited

U.S. PATENT DOCUMENTS

| | | | | |
|---|---|---|---|---|
| 3,557,028 A * | 1/1971 | Turk | ...... | C08L 21/00 525/192 |
| 4,674,622 A * | 6/1987 | Utsunomiya | ........... | B32B 25/10 198/500 |
| 4,794,134 A * | 12/1988 | Wheeler | ............ | C08K 5/34922 524/100 |
| 5,120,779 A * | 6/1992 | Cornell | ................ | C07D 251/70 152/525 |
| 5,714,022 A * | 2/1998 | Nagao | ................... | B60C 1/0025 152/525 |
| 6,300,421 B1 * | 10/2001 | Blok | ......................... | C08K 3/06 525/331.1 |
| 6,393,655 B1 * | 5/2002 | Dailey | ................... | C08F 236/10 15/250.48 |
| 6,540,069 B2 * | 4/2003 | Tschantz | ................. | B65G 15/08 198/819 |
| 6,800,691 B2 * | 10/2004 | Graf | ....................... | C08L 23/16 524/425 |
| 2004/0129358 A1 * | 7/2004 | Ernst | ...................... | B60C 1/0016 152/209.5 |
| 2007/0155889 A1 | 7/2007 | Okamoto | | |
| 2017/0361653 A1 * | 12/2017 | Saintigny | .............. | B60C 1/0016 |

FOREIGN PATENT DOCUMENTS

| | | |
|---|---|---|
| EP | 1033386 A1 | 9/2000 |
| EP | 2803698 A1 | 11/2014 |
| EP | 2883714 A1 | 6/2015 |

* cited by examiner

*Primary Examiner* — William R Harp
(74) *Attorney, Agent, or Firm* — David L. Cate

(57) ABSTRACT

Rubber blends of SBR and EPDM having improved dynamic ozone resistance, heat resistance, and flex fatigue resistance can be made by co-curing such rubber blends with a sulfur donor/accelerator and a peroxide curing agent. In some aspects, these blends are void of free sulfur. These cured rubber formulations can advantageously be used in a wide variety of industrial rubber products, such as in conveyor belts. The disclosure also reveals conveyor belts which have a combination of good dynamic ozone resistance, heat resistance, and flex fatigue resistance. The conveyor belt include a carry cover layer, a pulley cover layer, and a reinforcement layer which is situated between the carry cover layer and the pulley cover layer, and the carry cover layer and/or the pulley cover layer contain cured rubber formulations according to the disclosure.

15 Claims, No Drawings

HEAT, FLEX FATIGUE AND OZONE RESISTANT CONVEYOR BELT COVER

RELATED APPLICATION INFORMATION

This application is a National Stage entry from international patent application PCT/US2016/039987, filed Jun. 29, 2016, designating the United States and claiming priority from U.S. Provisional Patent Application No. 62/198,759, filed Jul. 30, 2015, and the entire content of both applications is incorporated herein by reference.

FIELD

The field to which the disclosure generally relates is conveyor belts, and more particularly to improved carry cover layers and/or pulley cover layers for conveyor belts.

BACKGROUND

This section provides background information to facilitate a better understanding of the various aspects of the disclosure. It should be understood that the statements in this section of this document are to be read in this light, and not as admissions of prior art.

In a multitude of commercial applications, it is common to employ conveyor belts for the purpose of transporting products and materials. Such conveyor belts can serve in applications which have minimal demands, moderate demands, or in applications which are extremely demanding and which require heavy-duty conveyor belts. Conveyor belts can also vary greatly in size and length. For instance, the conveyor belts used in mining applications can be up to about three meters wide and very long, for example, on the order of many kilometers. They can also be up to about 8 centimeters thick, or even thicker. In any case, heavy-duty conveyor belts are widely used for moving minerals, coal, agricultural products, and a wide variety of manufactured products from one point to another. For instance, heavy-duty conveyor belts are often used in typical mining applications to transport minerals below the ground, to above the surface, and ultimately above ground to a desired location for processing and/or ultimately for transportation on rail road cars, trucks, barges, or ships.

Conveyor belts are also widely used in a wide variety of applications which have only moderate or even light demands. For instance, conveyor belts are commonly used in conveying groceries and household items at the check-out lanes of grocery stores and supermarkets. Conveyor belts of this type are frequently used for many hours of every day and can be subjected to user abuse caused by spills and contact with items having sharp edges which can cut the surface of the belt. Accordingly, high demands are frequently put on such belts even though the items being conveyed in such applications are normally light and non-abrasive in character. In applications of this type where consumers are using and seeing the conveyor belt it is also important for the conveyor belt to maintain an aesthetically good appearance throughout its service life.

Pipe conveyors, also referred to as tube conveyors or tubular conveyors, are conveyor belts which are loaded with a material to be conveyed and after being loaded are closed into the conformation of a tube by mechanical means to force the conveyor into a closed tube by overlapping the belt edges. After being closed into the form of a tube the material being conveyed is protected from external elements and is also contained within the tube to in help prevent loss of the material being conveyed. In any case, a plurality of support and guide assemblies for the conveyor are situated along the conveyor path to open and close the conveyor as desired at different points along the path of the conveyor. Each assembly includes a plurality of support and guide rollers, which contact and hold the pipe conveyor belt while in operation.

Pipe belts are predominantly employed where bulk material is conveyed in a relatively confined space through horizontal and vertical curves. By virtue of their special adaptability to various topographical conditions, pipe belt conveyor systems are also used for conveying material over distances longer than 1 kilometer. The advantages offered by pipe belts include protection of the transported material against environmental influences (rain, wind, etc.) and protection of the environment against material dropping from the conveyor belt (ashes from power plants, gypsum, etc.). In some cases pipe belts also protect the material being transported from theft by employees and third parties that may be present in the area through which the material is being conveyed.

Pipe conveyor belts are flexed by opening and closing during every cycle of operation to allow for the material being conveyed to be loaded and unloaded from the belt. This opening and closing action subjects the pipe belt a substantial amount of repeated flex which is encountered even during normal operations. In addition to this, pipe belts are prone to running off course or twisting under certain operating conditions. Belts may twist because of uneven loading, uneven guidance through curves, or otherwise poorly aligned systems. For this reason, support and guide rollers are optimally designed to provide for trouble-free and low maintenance operation as the pipe belt travels through the conveyor system. The rollers are individually aligned depending upon the course that the conveyor system is running. The functionality of the rollers is influenced by varying weather and temperature conditions, wear, and design defects. For example, moisture reduces friction between the rollers and the conveyor belt, which results in guidance that is not optimal. If the pipe conveyor belt is misaligned or twisted, for example as it is running up on an ejecting drum, the conveyor belt can fold or even run off of the drum sideways. During any of these adverse operating conditions the pipe belt can be subjected to even more flexing.

In any case, all conveyor belts are flexed during normal operation and can be flexed to an even greater degree during periods of abnormal operation or when being abused. It is accordingly important for most conveyor belts to exhibit a high degree of flex fatigue and dynamic ozone resistance to provide a long service life and to maintain an aesthetically good appearance and optimal functionality. For instance, the aesthetic appearance of a conveyor belt can be quickly destroyed by surface cracking that results from insufficient flex fatigue resistance and dynamic ozone resistance in the outer cover layer of the belt.

Conveyor belts are typically comprised of a polymeric material which has an adequate combination of strength and flexibility to meet the needs demanded in the particular application where the belt will be used. For instance, conveyor belts are commonly comprised of a cured rubber or multiple layers of various cured rubbers. Such conveyor belts also frequently include one or more layers of reinforcement which provide the belt with additional strength and durability. The reinforcement can be comprised of a polymeric fabric or metal reinforcements, such as steel reinforcements.

Conventional conveyor belts which are used in heavy duty applications are typically comprised of a cured rubber as a top layer (the carry cover layer), a cured rubber as a bottom layer (the pulley cover layer), and a reinforcement layer which is situated between the top layer and the bottom layer. The prominent material used in such conveyor belts generally is a moderately flexible elastomeric or rubber-like material, and the belt is typically reinforced by a plurality of longitudinally extending steel cables or cords which are positioned within the belt and extend along the length thereof.

Surface cracking due to inadequate flex fatigue and dynamic ozone resistance is a problem that continues to persist in virtually all types of conveyor belts. It is a particularly difficult problem in pipe belts due to the degree of flexing which they encounter during normal use and which can be aggravated during abnormal operation. Even though surface cracking in the cover layer of many types of conveyor belts is a long standing problem, a means to eliminate it has proven to be elusive. There has accordingly been a long felt need for conveyor belts having better flex fatigue and dynamic ozone resistance in their cover layer to provide longer service life without encountering surface cracking.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Some embodiments according to the disclosure are based upon the discovery that rubber blends of styrene-butadiene rubber (SBR) and ethylene-propylene-diene monomer rubber (EPDM) having improved dynamic ozone resistance, heat resistance, and flex fatigue resistance can be made by curing such rubber blends with a sulfur donor/accelerator and a peroxide curing agent. In some aspects, it is important for these blends to be void of free sulfur to attain this highly desired combination of properties. These cured rubber formulations can advantageously be used in a wide variety of industrial rubber products which also require high level of tear, cut, abrasion and puncture resistance, as well as high tensile strength, such as in conveyor belts.

According to some embodiments, a curable rubber formulation includes a blend of about 45 phr to about 75 phr of styrene-butadiene rubber, about 25 phr to about 50 phr of an ethylene-propylene-diene monomer rubber, about 1.8 phr to 3.6 phr of a sulfur donor/accelerator, and about 0.2 phr to 2.0 phr of a peroxide curing agent.

Some embodiments of the disclosure also include methods of curing a rubber formulation which includes about 45 phr to about 75 phr of styrene-butadiene rubber and about 25 phr to about 50 phr of an ethylene-propylene-diene monomer rubber to provide cured rubber formulations with a combination of good dynamic ozone resistance, heat resistance, and flex fatigue resistance. The methods involve curing the rubber formulation with a curative system which includes about 1.8 phr to 3.6 phr of a sulfur donor/accelerator, and about 0.2 phr to 2.0 phr of a peroxide curing agent.

Embodiments according to the disclosure also provide conveyor belts which have a combination of good dynamic ozone resistance, heat resistance, and flex fatigue resistance. The conveyor belts include a carry cover layer, a pulley cover layer, and a reinforcement layer which is situated between the carry cover layer and the pulley cover layer, where the carry cover layer and/or the pulley cover layer contain a cured rubber formulation including about 45 phr to about 75 phr of styrene-butadiene rubber and about 25 phr to about 50 phr of an ethylene-propylene-diene monomer rubber. The cured rubber formulation is cured with a curative system which includes about 1.8 phr to 3.6 phr of a sulfur donor/accelerator and about 0.2 phr to 2.0 phr of a peroxide curing agent. In pipe belts the cured rubber formulations according to the disclosure are utilized in the pulley cover layer, and are typically not used in the carry cover layer.

DETAILED DESCRIPTION

The following description of the variations is merely illustrative in nature and is in no way intended to limit the scope of the disclosure, its application, or uses. The description and examples are presented herein solely for the purpose of illustrating the various embodiments of the disclosure and should not be construed as a limitation to the scope and applicability of the disclosure. While the compositions of the present disclosure are described herein as comprising certain materials, it should be understood that the composition could optionally comprise two or more chemically different materials. In addition, the composition can also comprise some components other than the ones already cited. In the summary of the disclosure and this detailed description, each numerical value should be read once as modified by the term "about" (unless already expressly so modified), and then read again as not so modified unless otherwise indicated in context. Also, in the summary of the disclosure and this detailed description, it should be understood that a concentration or amount range listed or described as being useful, suitable, or the like, is intended that any and every concentration or amount within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors had possession of the entire range and all points within the range.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of concepts according to the disclosure. This description should be read to include one or at least one and the singular also includes the plural unless otherwise stated.

The terminology and phraseology used herein is for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited.

Also, as used herein any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

Rubber formulations according to the disclosure include a blend of SBR and EPDM which is co-cured with a combination of a sulfur donor/accelerator and a peroxide curing agent. These blends will typically contain from about 45 phr to about 75 phr of SBR and from about 25 phr to about 50 phr of the EPDM rubber. The rubber formulations may more typically contain from about 60 phr to about 75 phr, or even from about 60 phr to about 72 phr, of the SBR, and from about 28 phr to about 40 phr of the EPDM rubber. In some aspects, the rubber formulation contains from about 65 phr to about 70 phr of the SBR and from 30 about phr to about 35 phr of the EPDM. These rubber formulations can further contain natural rubber or synthetic polyisoprene rubber for improved tear resistance, nitrile rubber or polychloroprene rubber for improved oil and chemical resistance or polybutadiene rubber for improved abrasion resistance in small amounts of up to about 30 phr and will typically be used at a level of less than about 15 phr. These rubber formulations may also contain conventional reinforcing fillers, such as carbon black at levels within the range of about 30 phr to about 60 phr, and conventional rubber compounding ingredients, such as antioxidants, antiozonants, processing aids, processing oils, flame retardants, waxes and the like.

In embodiments, the rubber formulations according to the disclosure include EPDM rubber having a suitable amount of diene functional monomer as a component of the EPDM rubber. The EPDM rubber is generally a terpolymer of ethylene, propylene, and diene functional monomers. In some aspects, the EPDM rubber from about 2.5% to about 12% weight of diene functional monomer, and in some other aspects, at least 6% by weight of diene functional monomer.

According to some aspects of the disclosure, co-curing the SBR/EPDM blend with a specific combination of a sulfur donor/accelerator and a peroxide curing agent provides cured rubber formations with improved dynamic ozone resistance, heat resistance, and flex fatigue resistance. In some cases, it may be required that the curing reaction be conducted in the absence of free sulfur and for the resulting cured rubber formulation to be void of free sulfur. In any case, the rubber formulation will typically be cured with about 1.8 phr to about 3.5 phr of the sulfur donor/accelerator and will more typically be cured with about 2.0 phr to about 3.0 phr of the sulfur donor/accelerator. In some cases, the sulfur donor/accelerator is to be employed at a level which is within the range of about 2.2 phr to about 2.5 phr. The peroxide curing agent will typically be employed at a level which is within the range of about 0.2 phr to about 2.0 phr and will more typically be utilized at a level which is within the range of about 0.3 phr to about 1.5 phr. In some aspects, the peroxide curing agent is included at a level which is within the range of about 0.4 phr to about 0.8 phr. In some embodiments, the curing is conducted substantially in the absence of free sulfur, and further, the rubber formulation may be cured in the total absence of free sulfur.

The sulfur donor/accelerators which can be utilized according to the disclosure, include but are not necessarily limited to, 2-morpholinodithio benzothiazole, tetramethylthiuram disulfide (also referred to as Methyl Tuads), tetraethylthiuram disulfide (also referred to as Ethyl Tuads), dipentamethylenethiuram tetrasulfide, di-morpholino disulfide, dipentamethylene thiuram hexasulfide, n-butylthiuram disulfide, tetrabenzylthiuram disulfide, tetraisobutyl thiuram disulfide, tetraethylthiuram disulfide, N-oxydiethylenethiocarbamyl-N-oxydiethylene, dimethyl diphenyl thiuram disulfide, and the like. In many cases the sulfur donor/accelerator will be a thiuram ultra accelerator, such as a tetralkylthiuram disulfide. The sulfur donor/accelerator can also be a dialkyldithiophosphate polysulfide.

The peroxide curing agents which can be utilized according to the disclosure are those which are generally suitable for curing EPDM. Some representative examples of organic peroxides which can be used include, but not limited to, dicumyl peroxide, t-butyl perbenzoate, di-t-butyl peroxide, 2,5-dimethyl-2,5-di-t-butylperoxyhexane, alpha-alpha'-bis(t-butylperoxy) diisopropylbenzene, methylethyl ketone peroxide, cyclohexanone peroxide, cumene hydroperoxide, pinane hydroperoxide, p-menthane hydroperoxide, t-butyl hydroperoxide, di-t-butyl peroxide, and the like. Dicumyl peroxide and alpha-alpha'-bis(t-butylperoxy) diisopropylbenzene are preferred peroxide compounds in some embodiments.

The cured according to the disclosure are of particular value when used as the cover layer of conveyor belts. More particularly they can be utilized in the carry cover layer and/or the pulley cover layer of conveyor belts to provide a higher level of flex fatigue resistance, dynamic ozone resistance, and heat resistance. They are of utmost value for use in pipe conveyor belts, such as the pipe conveyor belts described in U.S. Pat. No. 7,942,259. The teachings of U.S. Pat. No. 7,942,259 are incorporated by reference herein for the purpose of describing pipe conveyor belts into which the rubber formulations of the disclosure can be utilized. In any case, the pipe conveyor belts according to the disclosure have an elastomeric body with a load carrying surface located on the top surface, or internal surface rolled within the elastomeric body. The tubular conveyor belts according to the disclosure will have a width, a length, a longitudinal centerline, a first longitudinal edge, an opposing second longitudinal edge, and a load bearing region. The elastomeric body will normally include plies of fabric or reinforcing steel cables that typically run longitudinally within the pipe conveyor belt. During use, the first longitudinal edge and the second longitudinal edge can overlap to form an overlap region forming the belt into a tube-like shape. The load bearing region is located substantially evenly about the belt longitudinal centerline throughout the length of the belt. In practice the pulley cover layer of the pipe conveyor belt contains cured rubber compositions according to the disclosure.

Embodiments of the disclosure illustrated by the following examples that are merely for the purpose of illustration and are not to be regarded as limiting the scope of the disclosure, or the manner in which it can be practiced. Unless specifically indicated otherwise, parts and percentages are given by weight.

Examples 1-2 and Control

In this experiment a series of rubber formulations were prepared, cured and tested for physical properties. In the procedure used, non-productive rubber formulations were prepared utilizing the ingredients identified in Table 1. Then productive rubber formulations were made by further adding the ingredients identified in Table 1 to the non-productive formulations. The quantities reported in Table 1 are in phr.

TABLE 1

|  | Control | Working Example 1 | Working Example 2 |
|---|---|---|---|
| Non-productive |  |  |  |
| SBR1502 | 100 | 70 | 70 |
| Royalene 509 EPDM | 0 | 30 | 30 |
| N330 Carbon black | 57 | 0 | 50 |
| N220 Carbon black | 0 | 45 | 0 |
| Tall oil fatty acid | 1 | 1 | 1 |
| Aromatic oil | 10 | 0 | 0 |
| Naphthenic oil | 0 | 3 | 3 |
| Zinc Oxide | 3 | 5 | 5 |
| ZMTI antioxidant | 2 | 2 | 2 |
| Polystay ® 100 antiozonant | 1 | 1 | 1 |
| Agerite Resin D antioxidant | 2 | 2 | 2 |
| 6PPD antiozonant | 0 | 3 | 3 |
| Struktol HPS 11 processing aid | 4 | 4 | 4 |
| Paraffin wax | 1 | 1 | 1 |
| Microcrystalline wax | 0 | 1.5 | 1.5 |
| Productive |  |  |  |
| Morfax accelator and sulfur donor | 2.25 | 2.25 | 2.25 |
| PVI retarder | 0.25 | 0.25 | 0.25 |
| Perkacit ZDBC accelerator | 2.25 | 2.25 | 2.25 |
| DCP peroxide (60%) active | 0 | 1 | 1 |
| Phr | 185.75 | 174.25 | 179.25 |
| Specific Gravity: | 1.1456 | 1.1108 | 1.1230 |

The productive rubber formulations were subsequently cured and tested for physical properties. The cured rubber formulations were determined to have the original and oven aged cure characteristics and physical properties delineated in Table 2.

TABLE 2

|  | control | Working Example 1 | Working Example 2 |
|---|---|---|---|
| Mooney Scorch (30 min @250° F.) |  |  |  |
| ML (dN · m) | 20.3 | 21.4 | 20.7 |
| t5 (minutes) | 18.89 | 24.52 | 20.63 |
| MDR Rheometer (30 min@315 F.) |  |  |  |
| Min (dN · m) | 2.827 | 3.141 | 3.088 |
| Max (dN · m) | 14.54 | 14.95 | 14.58 |
| Tris1(minutes) | 1.94 | 2.46 | 2.53 |
| T25 (minutes) | 2.65 | 4.27 | 4.61 |
| S25 (dN · m) | 5.759 | 6.091 | 5.961 |
| T90 (minutes) | 7.73 | 10.31 | 13.6 |
| S90 (dN · m) | 13.37 | 13.77 | 13.43 |
| Rate (dN · m/min) | 3.1 | 2.06 | 1.42 |
| Amount (dN · m) | 11.71 | 11.81 | 11.49 |
| Original Physical Properties (20 h@315° F.) |  |  |  |
| Tensile (psi) | 3076 | 2559 | 2321 |
| Elongation, % | 888 | 702 | 660 |
| Mod 100 (psi) | 214 | 234 | 254 |
| Mod 300 (psi) | 674 | 842 | 899 |
| Hardness | 59 | 63 | 62 |
| DIN (mm³) | 139 | 144 | 138 |
| Air Oven Age (48 h@284° F.) |  |  |  |
| Tensile (psi) | 2368 | 2201 | 2266 |
| Elongation, % | 516 | 515 | 509 |
| Mod 100 (psi) | 432 | 463 | 492 |
| Mod 300 (psi) | 1450 | 1387 | 1422 |
| Hardness | 71 | 72 | 73 |
| Tensile change, % | −23 | −14 | −2 |
| Elongation change, % | −42 | −27 | −23 |
| Hardness change, pts | 12 | 9 | 11 |
| Air Oven Age (96 h@284° F.) |  |  |  |
| Tensile (psi) | 2048 | 2109 | 1904 |
| Elongation, % | 290 | 341 | 204 |
| Mod 100 (psi) | 772 | 775 | 1079 |
| Mod 300 (psi) | 2130 | 1941 |  |
| Hardness | 76 | 77 | 82 |
| Tensile change, % | −33 | −18 | −18 |
| Elongation change, % | −67 | −51 | −69 |
| Hardness change, pts | 17 | 14 | 20 |
| Air Oven Age (120 h@284° F.) |  |  |  |
| Tensile (psi) | 2108 | 1916 | 2035 |
| Elongation, % | 263 | 272 | 248 |
| Mod 100 (psi) | 866 | 876 | 963 |
| Hardness | 80 | 80 | 80 |
| Tensile change, % | −31 | −25 | −12 |
| Elongation change, % | −70 | −61 | −62 |
| Hardness change, pts | 21 | 17 | 20 |
| Air Oven Age (168 h@284° F.) |  |  |  |
| Tensile (psi) | 1773 | 1871 | 2040 |
| Elongation % | 133 | 168 | 253 |
| Mod 100 (psi) | 1432 | 1275 | 965 |
| Hardness | 82 | 83 | 79 |
| Tensile change, % | −42 | −27 | −12 |
| Elongation change, % | −85 | −76 | −62 |
| Hardness change, pts | 23 | 20 | 19 |
| DeMattia Flex |  |  |  |
| 10 Minute Initial | 2.4 | 4.4 | 4.4 |
| 54k Cycles | 6.7 | 7.5 | 8 |
| 108k Cycles | 9.3 | 7.5 | 8.2 |
| 162k Cycles | 10.7 | 7.5 | 8.3 |
| 216k Cycles | 11.8 | 7.6 | 8.5 |
| 324k Cycles | 14.0 | 7.6 | 8.5 |
| 648k Cycles | 16.8 | 7.8 | 8.6 |
| Dynamic Ozone (50 pphm, 25% strain, 104° F.) |  |  |  |
| Hrs to Fail | 24 | 168 | 96 |
| Rating* | D2 | A1 | A2 |

*Evaluation Code
0 = No cracking
Number of Cracks
A = Very few (less than ¼ surface)
B = Few (¼ to ½ surface)
C = Moderate (½ to ¾ surface)
D = Heavy (¾ to all surface)
F = Complete Failure (Break)
Size of Cracks
1 = Small (Hairline)
2 = Medium
3 = Large
4 = Severe As can be seen by reviewing Table 2, the working examples of the disclosure exhibited greatly improved flex fatigue resistance and dynamic ozone resistance as compared to the results determined for the control.

The foregoing description of the embodiments has been provided for purposes of illustration and description. Example embodiments are provided so that this disclosure will be sufficiently thorough, and will convey the scope to those who are skilled in the art. Numerous specific details are set forth such as examples of specific components, devices, and methods, to provide a thorough understanding of embodiments of the disclosure, but are not intended to be exhaustive or to limit the disclosure. It will be appreciated that it is within the scope of the disclosure that individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A curable rubber formulation comprising a blend of about 45 phr to about 75 phr of styrene-butadiene rubber, about 25 phr to about 50 phr of an ethylene-propylene-diene monomer rubber, about 1.8 phr to 3.6 phr of a sulfur donor/accelerator, about 0.2 phr to 2.0 phr of a peroxide curing agent, and at least one of N330 carbon black or N220 carbon black incorporated in an amount of from 45 phr to 50 phr, wherein the curable rubber formulation is void of free sulfur, and wherein after curing, the curable rubber formulation has a dynamic ozone resistance failure time of from 96 hours to 168 hours after exposure to conditions of 50 pphm ozone, 25% strain, and 104° F.

2. The curable rubber formulation according to claim 1 wherein the styrene-butadiene rubber is present at a level which is within the range of about 60 phr to about 72 phr.

3. The curable rubber formulation according to claim 1 wherein the ethylene-propylene-diene monomer rubber is present at a level which is within the range of about 28 phr to about 40 phr.

4. The curable rubber formulation according to claim 1 wherein the styrene-butadiene rubber is present at a level which is within the range of about 70 phr to about 75 phr.

5. The curable rubber formulation according to claim 1 wherein the ethylene-propylene-diene monomer rubber is present at a level which is within the range of about 30 phr to about 35 phr.

6. The curable rubber formulation according to claim 1 wherein the sulfur donor/accelerator is present at a level which is within the range of about 2.0 phr to about 3.0 phr.

7. The curable rubber formulation according to claim 1 wherein the peroxide curing agent is present at a level which is within the range of about 0.3 phr to about 1.5 phr.

8. The curable rubber formulation according to claim 1 wherein the sulfur donor/accelerator is present at a level which is within the range of about 2.2 phr to about 2.5 phr.

9. The curable rubber formulation according to claim 1 wherein the peroxide curing agent is present at a level which is within the range of about 0.4 phr to about 0.8 phr.

10. The curable rubber formulation according to claim 1 wherein the wherein the ethylene-propylene-diene monomer rubber comprises at least 6% by weight of a diene functional monomer.

11. A method of curing a rubber formulation which is comprised of about 45 phr to about 75 phr of styrene-butadiene rubber and about 25 phr to about 50 phr of an ethylene-propylene-diene monomer rubber to provide cured rubber formulation with a combination of dynamic ozone resistance, heat resistance, and flex fatigue resistance, said method comprising curing the rubber formulation with a curative system which includes about 1.8 phr to 3.6 phr of a sulfur donor/accelerator, about 0.2 phr to 2.0 phr of a peroxide curing agent, and at least one of N330 carbon black or N220 carbon black incorporated in an amount of from 45 phr to 50 phr, wherein the curable rubber formulation is void of free sulfur, and wherein after curing, the curable rubber formulation has a dynamic ozone resistance failure time of from 96 hours to 168 hours after exposure to conditions of 50 pphm ozone, 25% strain, and 104° F.

12. The method according to claim 11 wherein the styrene-butadiene rubber is present at a level which is within the range of about 60 phr to about 75 phr.

13. The method according to claim 11 wherein the ethylene-propylene-diene monomer rubber is present at a level which is within the range of about 28 phr to about 40 phr.

14. The method according to claim 11 wherein the sulfur donor/accelerator is present at a level which is within the range of about 2.0 phr to about 3.0 phr.

15. The method according to claim 11 wherein the peroxide curing agent is present at a level which is within the range of about 0.3 phr to about 1.5 phr.

* * * * *